United States Patent Office 3,539,568
Patented Nov. 10, 1970

3,539,568
PROCESS FOR PREPARING DICARBOXIMIDE DERIVATIVES
Richard L. Jacobs, Perrysburg, Ohio, assignor, by mesne assignments, to The Sherwin-Williams Company, a corporation of Ohio
No Drawing. Filed Sept. 5, 1967, Ser. No. 665,279
Int. Cl. C07d 51/76
U.S. Cl. 260—250                 5 Claims

ABSTRACT OF THE DISCLOSURE

A process for preparing 2,3- and 3,4-pyridine-dicarboximides and 2,3 - pyrazinedicarboximide. The compounds are produced by reacting a 2,3- or 3,4-pyridine-dicarboxylic acid or 2,3-pyrazinedicarboxylic acid with a mixture of acetic anhydride and acetamide or equivalent. The dicarboximides are useful intermediates in the production of agricultural chemicals and in particular selective weed killers and plant growth regulators.

BACKGROUND OF THE INVENTION

In the prior art (Ber. 58, 1727 (1925): J. Org. Chem., 14, 97(1949)) the pyridinedicarboximides of the above described type have been produced by first reacting corresponding pyridinedicarboxylic acids with acetic anhydride to form pyridinedicarboxylic acid anhydrides. The anhydrides are then purified and the purified products are reacted with acetamide in the presence of acetic anhydride to form the corresponding imides. The difficulty with this process is that it requires excessive time to complete all of the steps (anywhere from 11 to 60 hours) and the yields are not so large as desired. Because of the excessive time required to carry out the steps, the process is not commerically economical.

A new one step process has now been discovered for the production of pyridinedicarboximides and other heterocyclic based imides which can be carried out in a short period of time and which results in increased yields and a higher degree of purity over the method of the prior art.

OBJECTS

It is an object of this invention to provide a new and improved method for the production of heterocylic based imides.

It is an object of this invention to provide a new and improved method for the production of 2,3- and 3,4-pyridinedicarboximides and 2,3-pyrazinedicarboximide.

It is a further object of this invention to provide a one step method for the production of heterocyclic based imides which is economical, and which provides improved yields and higher purity products than the methods of the prior art.

SUMMARY OF THE INVENTION

The process of this invention comprises reacting with substantially constant agitation (A) a compound selected from those having the general formula

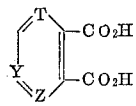

wherein each of T, Y, and Z is nitrogen or carbon and at least one is carbon and at least one is nitrogen, and wherein when Y is nitrogen, T and Z are carbon; with (B) a mixture of an excess of acetic anhydride and an excess of acetamide, urea, formamide or diammonium carbonate, the reaction being carried out at a temperature ranging from the boiling point of acetic acid to about [1]140°, and for a period of time ranging from about ½ to about 2 hours.

The compounds which are encompassed within the general formula set forth under (A) above are known as 2,3- or 3,4-pyridine and 2,3-pyrazinedicarboxylic acids.

Examples of suitable dicarboxylic acids for use in the practice of this invention include 2,3-pyridinedicarboxylic acid, 3,4-pyridinedicarboxylic acid, and 2,3-pyrazinedicarboxylic acid.

In carrying out the process of this invention, all of the reactants are charged, more or less simultaneously, into a reaction vehicle, and stirring is begun while heat is applied. The order of charging is substantially immaterial. Heating is continued until the reaction mixture reaches a temperature in excess of about 118° up to 140°. One of the reaction by-products is acetic acid (B.P. 118°) and the continual boiling off of the acetic acid is essential for the reaction to go to completion. Thus, in order to insure complete elimination of acetic acid from the reaction mixture, thereby forcing the reaction to completion, the raction should be conducted at a temperature of or in excess of the boiling point of acetic acid, and preferably between 130°–140°. At temperatures higher than about 140°, some of the initial reactants begin to volatize, these being acetic anhydride and possibly the acetamide or equivalent. The percent yield is decreased as a result.

This reaction can be illustrated as follows, using 2,3-pyridinedicarboxylic acid, acetic anhydride and acetamide as the reactants.

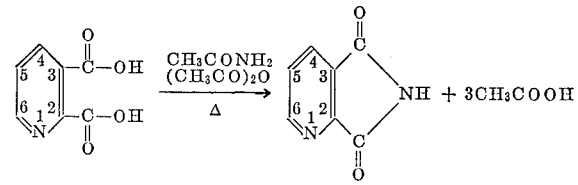

It is essential that the reaction mixture be stirred or agitated more or less constantly while the process is being carried out. This is in order to insure adequate mixing of the various reactants.

The optimum reaction time for the process of this invention is about 1 hour. Shorter times can be used, ½ hour, for example; however, in that instance the percent yield is not so large. Longer times than one hour can be used, i.e. up to about 2 hours; however, no major increase in yield is observed.

The pyridinedicarboxylic acid and pyrazinedicarboxylic acid starting compounds used in the process of this invention are well known chemicals and can be prepared by known means.

Acetamide is a preferred reactant as a source of the NH radical. Other compounds which can be used, however, include urea, formamide, and diammonium carbonate. The yields using these latter compounds are lower than when acetamide is used; however, these compounds are desirable for use because of their low cost relative to acetamide, being of the order of about one-sixth as expensive in the case of urea.

In the process of this invention it is desirable to use about twice as much acetic anhydride and about three times as much acetamide or equivalent as is stoichiometrically required to react with the heterocyclic dicarboxylic ---
[1] All temperatures herein and in the claims are in degrees centigrade.

acid starting compounds. This assures maximum yields, based upon the dicarboxylic acids. Lesser stoichiometric ratios than those indicated above can be used but in that instance the yield is decreased. At least a 1:1:1 stoichiometric quantity of heterocyclic dicarboxylic acid to acetamide or equivalent and acetic anhydride should be used.

This invention will be more clearly understood by reference to the following examples. It is not intended to be limited thereby, however.

EXAMPLE I

Preparation of 2,3-pyridinedicarboximide

A 2 liter, 3 necked flask equipped with a strirrer and a thermometer, and partially immersed in an oil bath was charged with 400 g. 2,3-pyridinedicarboxylic acid, 400 g. acetamide, and 400 ml. acetic anhydride. Agitation was begun and was continued throughout the reaction. The reaction mixture was heated rapidly to a temperature of 136° and held at that temperature for 2 hours. At the end of this time, the mixture was cooled; the solids were removed by filtration, and the filtrate was set aside. The solids were washed with cold methanol, dried, and weighed. There was obtained 251.6 g. light tan material having a melting point of 239–240°. The filtrate which had been set aside was evaporated to dryness; the residue was washed with cold methanol, dried, and weighed. There was obtained 9.2 g. medium brown material having a melting point of [2] 239–240°. The total yield was 260.8 g. 2,3-pyridinedicarboximide, representing 74.8% of theory.

A stoichiometric amount of urea, formamide, or diammonium carbonate can be substituted for the acetamide in the above reaction with substantially equivalent results.

EXAMPLE II

Preparation of 3,4-pyridinedicarboximide 150 ml. beaker equipped with a stirrer and thermometer, and partially immersed in an oil bath was charged with 20 g. 3,4-pyridinedicarboxylic acid, 20.0 g. acetamide, and 20 ml. acetic anhydride. Agitation was begun and was continued throughout the reaction. The reaction mixture was heated rapidly to a temperature of 135°, and was then held at a temperature in the range of 135–140° for 1 hour. At the end of this time, the mixture was cooled, the solids were removed by filtration, and the filtrate was set aside. The solids were washed with cold methanol, dried, and weighed. There was obtained 15.8 g. light tan material having a melting point of 230.0–231.5°. The filtrate which had been set aside was evaporated to dryness; the residue was washed with cold methanol, dried, and weighed. There was obtained 0.4 g. material having a melting point of [3] 229.5–231.0°. The total yield was 16.2 g. of 3,4-pyridinedicarboximide, representing about 91.5% of theory.

A stoichiometric amount of urea, formamide, or diammonium carbonate can be substituted for the acetamide in the above reaction with substantially equivalent results.

EXAMPLE III

Preparation of 2,3-pyrazinedicarboximide

A 250 ml. 3 necked flask equipped with a stirrer and a thermometer, and partially immersed in an oil bath was charged with 40.0 g. 2,3-pyrazinedicarboxylic acid, 40.0 g. acetamide, and 40.0 ml. acetic anhydride. Agitation was begun and was continued throughout the reaction. The reaction mixture was heated rapidly to a temperature of about 140° and was held at substantially that temperature for about 2½ hours. At the end of this time, the mixture was cooled and the solids were removed by filtration. The solids were washed with cold methanol, dried, and weighed. There was obtained 26.7 g. pale purple material having a melting point of [4] 246–7°, representing 75.2 percent of theory.

A stoichiometric amount of urea, formamide, or diammonium carbonate can be substituted for the acetamide in the above reaction with substantially equivalent results.

The compounds produced by the method of this invention are useful as intermediates in the production of agricultural chemicals and in particular as plant growth regulators or weed killers, and pharmaceuticals.

For example, it has been found that 3-substituted-pyrido[3,2-d]- and [2,3-d]pyrimidine-2,4(1H,3H)-diones, and 3-substituted-pyrido [3,4-d] and [4,3-d]pyrimidine-2,4(1H,3H)-diones are effective as weed killers.

It has also been found that 3-substituted lumazines are effective weed killers.

These compounds can be made from the 2,3-pyridinedicarboximide or pyrazinedicarboximide, or 3,4-pyridinedicarboximide made in accordance with the method of this invention, by carrying out the reactions described below to produce, for purposes of illustration, 3-isopropylpyrido [3,2-d]-pyrimidine-2,4(1H,3H)-dione, a particularly effective weed killer.

A quantity of 2,3-pyridinedicarboximide is made in accordance with the method of this invention, as illustrated in Example 1 hereof. The 2,3-pyridinedicarboximide is then reacted with isopropylamine in the presence of an anhydrous solvent such as ethanol to form the corresponding amide (actually a mixture of isomeric amides). The reaction is conducted at temperatures ranging from 0° up to 50°. This reaction can be illustrated as follows:

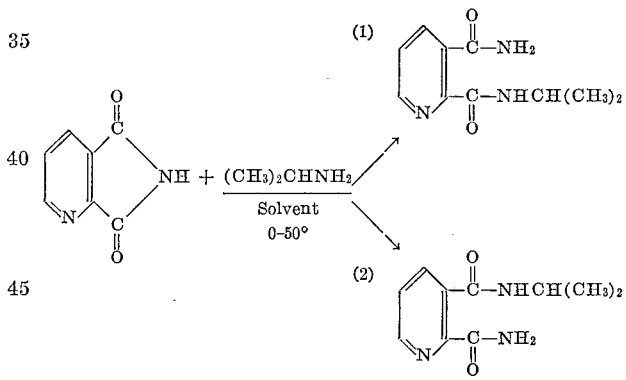

The two isomeric amides thus formed, (1) being 3-carbamoyl - 2(N - isopropylcarbamoyl)pyridine, and (2) being 2-carbamoyl-3(N-isopropylcarbamoyl)pyridine, are separated, either by preferential precipitation or by column chromatography.

After separation, 3-carbamoyl-2(N-isopropylcarbamoyl) pyridine is reacted with sodium hypochlorite in the presence of NaOH and water to form the desired end product, 3-isopropylpyrido[3,2-*d*]pyrimidine-2,4(1H,3H)-dione. This reaction can be illustrated as follows:

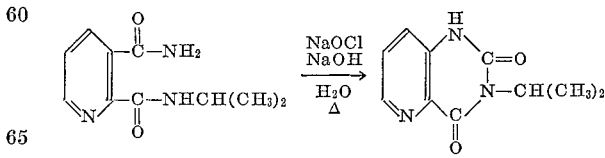

The best yields are obtained when a 1:1:1 mole ratio of amide to sodium hypochlorite to sodium hydroxide is used; however, satisfactory results are achieved when a 1:2:1 mole ratio is used.

In carrying out the process the sodium hypochlorite should first be admixed with sodium hydroxide, then the amide should be added to the mixture. If the components

---

[2] All melting points given in the examples herein are uncorrected. The literature melting point is 233°, Sucharda: Chem. Ber. 58, 1729 (1925).

[3] The literature melting point is 229–230°, Bachman and Barker: J. Org. Chem. 14, 97 (1949).

[4] The literature melting point is 245°, Gabriel and Sonn, Chem. Ber., 40, 4857.

are not admixed in this manner, there is a tendency for the amide to hydrolyze, resulting in a lower yield. The reaction is self-generating and will proceed in the absence of heat, but the reaction will go faster if the reaction mixture is heated. For that reason it is desirable to heat the reaction mixture to about 80° and hold it there for about ½ hour. Thereafter the mixture is cooled to room temperature and neutralized, at which time the product precipitates.

The 3-isopropyl-pyrido[2,3-d]pyrimidine-2,4(1H,3H)-dione analogue can be made by simply reacting 2-carbamoyl-3(N-isopropylcarbamoyl)pyridine with sodium hypochlorite in the presence of NaOH and water, as indicated above. The 3,4-pyridinedicarboximide, or 2,3-pyrazinedicarboximide compounds can be used instead of 2,3-pyridinedicarboximide in the above process, resulting in the production of 3-isopropyl-pyrido[3,4-d] and [4,3-d] - pyrimidine - 2,4(1H,3H)-dione, and 3-isopropyl lumazine, respectively. These compounds are also effective weed killers.

What I claim is:

1. A process of preparing 2,3- and 3,4-pyridinedicarboximides and 2,3-pyrazinedicarboximide which comprises reacting simultaneously
   (1) a compound selected from those having the formula

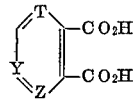

wherein each of T, Y and Z is nitrogen or carbon, and at least one is carbon and at least one is nitrogen, and wherein when Y is nitrogen, T and Z are carbon, with
   (2) a compound selected from the group consisting of acetamide, urea, formamide and diammonium carbonate, and
   (3) acetic anhydride,
said reaction being carried out with substantially constant agitation at a temperature ranging from the boiling point of acetic acid to about 140° and for a time sufficient for substantial completion of the reaction and at least about one-half hour.

2. The process of claim 1 wherein (A) is 2,3-pyridinedicarboxylic acid, (B) is acetamide, and the reaction time is about one hour.

3. The process of claim 1 wherein (A) is 3,4-pyridinedicarboxylic acid, (B) is acetamide, and the reaction time is about one hour.

4. The process of claim 1 wherein (A) is 2,3-pyrazinedicarboxylic acid, (B) is acetamide, and the reaction time is about one hour.

5. A process of preparing 2,3- and 3,4-pyridinedicarboximides and 2,3-pyrazinedicarboximide which comprises reacting simultaneously
   (1) a compound selected from those having the formula

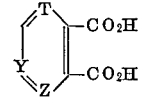

wherein each of T, Y and Z is nitrogen or carbon, and at least one is carbon and at least one is nitrogen, and wherein when Y is nitrogen, T and Z are carbon, with
   (2) a compound selected from the group consisting of acetamide, urea, formamide and diammonium carbonate, and
   (3) acetic anhydride,
said reaction being carried out with substantially constant agitation at a temperature ranging from about 130° to about 140° and for a time sufficient for substantial completion of the reaction and at least about one-half hour.

References Cited

Bachman et al., J. Org. Chem. Vol. 14, pp. 97–103 (1949).

NICHOLAS S. RIZZO, Primary Examiner

U.S. Cl. X.R.

71—92; 260—256.4, 295